(12) United States Patent
Tak et al.

(10) Patent No.: US 10,397,370 B2
(45) Date of Patent: Aug. 27, 2019

(54) PEER-BASED OPTIMAL PERFORMANCE CONFIGURATION RECOMMENDATION

(71) Applicant: International Business Machines Corporation, Armonk, NY (US)

(72) Inventors: Byung Chul Tak, Seoul (KR); Salman A. Baset, New York, NY (US); Sahil Suneja, Yorktown Heights, NY (US); Canturk Isci, Ridgewood, NJ (US)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 15/700,398

(22) Filed: Sep. 11, 2017

(65) Prior Publication Data

US 2019/0082033 A1    Mar. 14, 2019

(51) Int. Cl.

| G06F 15/177 | (2006.01) |
|---|---|
| H04L 29/08 | (2006.01) |
| G06F 17/18 | (2006.01) |
| G06F 17/16 | (2006.01) |
| G06F 11/30 | (2006.01) |

(52) U.S. Cl.
CPC .......... *H04L 67/34* (2013.01); *G06F 11/3006* (2013.01); *G06F 17/16* (2013.01); *G06F 17/18* (2013.01); *H04L 67/10* (2013.01)

(58) Field of Classification Search
CPC ....... H04L 67/34; H04L 67/10; H04L 7/0408; H04L 67/0876; G06F 11/3006; G06F 17/18; G04F 17/16
See application file for complete search history.

(56) References Cited

U.S. PATENT DOCUMENTS

| 6,934,745 B2 * | 8/2005 | Krautkremer | ....... H04L 41/0213 370/235 |
|---|---|---|---|
| 7,185,073 B1 * | 2/2007 | Gai | ..................... H04L 41/0893 709/221 |
| 8,832,239 B2 * | 9/2014 | Assuncao | ........... G06F 9/45558 709/220 |

(Continued)

OTHER PUBLICATIONS

Begnum, "Simplified cloud-oriented virtual machine management with MLN" The Journal of Supercomputing 61.2 (2012), pp. 251-266.

(Continued)

*Primary Examiner* — Thanh T Nguyen
(74) *Attorney, Agent, or Firm* — Edward J. Wixted, III (57) ABSTRACT

In an approach for determining optimal performance-related configurations of applications by analyzing peer data, a processor monitors instances of an application, wherein the instances of the application are running on a plurality of devices. A processor receives data related to: configuration parameters of the application, system parameters of the plurality of devices, and performance metrics of the plurality of devices. A processor determines correlation and dependencies between the configuration parameters with associated system parameters, using: an all pair analysis and a Pearson product-moment correlation coefficient (PPMCC). A processor determines dependencies between the configuration parameters with performance metrics. A processor recommends to a user, configuration settings of the application, based on the analysis of the data.

20 Claims, 3 Drawing Sheets

(56) References Cited

U.S. PATENT DOCUMENTS

| | | | | |
|---|---|---|---|---|
| 8,868,124 | B2* | 10/2014 | Uln | H04B 7/0408 370/318 |
| 9,306,806 | B1* | 4/2016 | Zhang | H04L 41/0853 |
| 2013/0125097 | A1* | 5/2013 | Ebcioglu | G06F 17/5045 717/136 |
| 2015/0019722 | A1* | 1/2015 | Narayanan | H04L 43/0876 709/224 |
| 2015/0358391 | A1* | 12/2015 | Moon | H04L 67/10 709/224 |
| 2016/0148074 | A1* | 5/2016 | Jean | G06F 16/5838 382/190 |
| 2018/0181808 | A1* | 6/2018 | Sridharan | G06K 9/00449 |

OTHER PUBLICATIONS

Begnum, "Towards autonomic management in system administration", Dissertation, University of Oslo Department of Informatics, Jun. 2008, 237 pages.

Fenz et al., "A Community Knowledge Base for IT Security." IT Professional 13.3 May/Jun. 2011, pp. 24-30.

Duan et al., "Tuning Database Configuration Parameters with iTuned", VLBD 2009, Aug. 24-28, Lyon, France, https://users.cs.duke.edu/~shivnath/papers/ituned.pdf, 12 pages.

Arlitt et al., "Characterizing the scalability of a large web-based shopping system", ACM Transactions on Internet Technology, vol. 1, No. 1, Aug. 2001, pp. 44-69.

Chung et al., "Automated cluster-based web service performance tuning", 13th IEEE International Symposium on High Performance Distributed Computing, HPDC '04, Washington, DC, pp. 36-44.

Delic et al. "Knowledge-Based Self-Management of Apache Web Servers", XXI International Symposium on Information, Communication and Automation Technologies, 2007, 4 pages.

Diad et al., "Managing Web server performance with AutoTune agents", IBM Systems Journal, vol. 42, Issue 1, 2003, pp. 136-149.

Oppenheimer et al., "Why do Internet services fail, and what can be done about it?", USITS'03: 4th Conference on USENIX Symposium on Internet Technologies and Systems, Mar. 26-28, 2003, Seattle, WA, 16 pages.

Saboori et al., "Autotuning Configurations in Distributed Systems for Performance Improvements using Evolutionary Strategies", The 28th International Conference on Distributed Computing Systems, 2008, pp. 769-776.

Sugiki et al., "A Practical Approach to Automatic Parameter-Tuning of Web Servers", 10th Asian Computing Science Conference on Advances in Computer Science: Data Management on the Web, Asian 2005, Berlin, Heidelberg, pp. 146-159.

Xi et al., "A Smart Hill-Climbing Algorithm for Application Server Configuration", The 13th International Conference on World Wide Web, New York, NY, pp. 287-296.

Yin et al., "An Emperical Study on Configuration Errors in Commercial and Open Source Systems", The Twenty-Third ACM Symposium on Operating Systems Principles, SOSP '11, New York, NY, pp. 159-172.

Zhang et al., "Fast Autotuning Configurations of Parameters in Distributed Computing Systems Using Ordinal Optimization", Proceedings of the 2009 International Conference on Parallel Processing Workshops, Washington, DC, pp. 190-197.

Zheng et al., "Automatic Configuration of Internet Services", EuroSys'07, Mar. 21-23, 2007, Lisboa, Portugal, pp. 219-229.

Randal, "How to examine IO subsystem latencies from within SQL Server", WWW.sqlskills.com, Posted on Apr. 11, 2011, Printed Sep. 11, 2017, http://www.sqlskills.com/blogs/paul/how-to-examine-io-subsystem-latencies-from-within-sql-served, 29 pages.

"Logging the Ultimate Guide", Apache Logging Basics-Ultimate Guide to Logging, WWW.loggly.com, Printed Sep. 11, 2017, https://www.loggly.com/ultimate-guide/apache-logging-basics/, 25 pages.

* cited by examiner

PEER-BASED OPTIMAL PERFORMANCE CONFIGURATION RECOMMENDATION

BACKGROUND

The present invention relates generally to the field of computing performance, and more particularly to determining optimal performance-related configurations of applications by analyzing peer data.

Distributed computing is a field of computer science that studies distributed systems. A distributed system is a model in which components located on networked computers communicate and coordinate their actions by passing messages. The components interact with each other in order to achieve a common goal. Three significant characteristics of distributed systems are: concurrency of components, lack of a global clock, and independent failure components. A computer program that runs in a distributed system is called a distributed program.

SUMMARY

Aspects of an embodiment of the present invention disclose a method, computer program product, and computing system for determining optimal performance-related configurations of applications by analyzing peer data. A processor monitors instances of an application, wherein the instances of the application are running on a plurality of devices. A processor receives data related to: configuration parameters of the application, system parameters of the plurality of devices, and performance metrics of the plurality of devices. A processor determines correlation and dependencies between the configuration parameters with associated system parameters, using: an all pair analysis and a Pearson product-moment correlation coefficient (PPMCC). A processor determines dependencies between the configuration parameters with performance metrics. A processor recommends to a user, configuration settings of the application, based on the analysis of the data.

DETAILED DESCRIPTION

Embodiments of the present invention recognize the problem in setting configurations of distributed applications to achieve optimal performance. Distributed applications, such as a webserver or a database, contain large number of configurations that critically affect their performance. For example, apache has over 240 configuration parameters, for which tuning can lead to over a 500% throughput increase when compared to default configuration settings. Sub-optimal configuration settings can yield orders of magnitude worse performance than what should actually be achieved, potentially resulting in capital wasted in procuring more systems to handle incoming workload. Embodiments of the present invention recognize that it is challenging to correctly configure these configurations that are dependent upon system hardware and runtime/system parameters. Embodiments of the present invention also recognize that relying on domain experts for optimal configuration tuning is not feasible, because experts are a scarce resource.

Currently, in the realm of databases and webservers, there are methods for configuration tuning by performing planned experiments, performance data sampling, and result reporting. Additional techniques include: neural network modeling, control system modeling, smart hill-climbing, and simulated annealing, amongst others, to build models of configuration values and predict expected performances. Embodiments of the present invention recognize that although some of the offline performance tuners can help configure applications for better performance, a major weakness of the offline performance tuners is the large amount of time and effort it takes, because the offline performance tuners are mostly based on a trial-and-error approach over a huge configuration value space. On the other hand, embodiments of the present invention also recognize that online tuning is only reactive and there are problems, such as arriving at sub-optimal local maxima or performance oscillations. Embodiments of the present invention disclose an approach for determining optimal performance-related configurations of applications by analyzing peer data.

Embodiments of the present invention take an analytics-oriented approach. Embodiments of the present invention look at a large corpus of scanned configuration dataset of distributed applications and build correlation models between performance configurations and system parameters. Embodiments of the present invention apply learning techniques to discover which configuration parameters are the most significant to use in the correlation construction. In doing so, embodiments of the present invention have designed a system to discover such multi-dimensional relationships so that, given a specific system parameter, embodiments of the present invention can recommend the optimal performance configuration settings of an application.

Embodiments of the present invention will now be described in detail with reference to the Figures.

Figure 1:
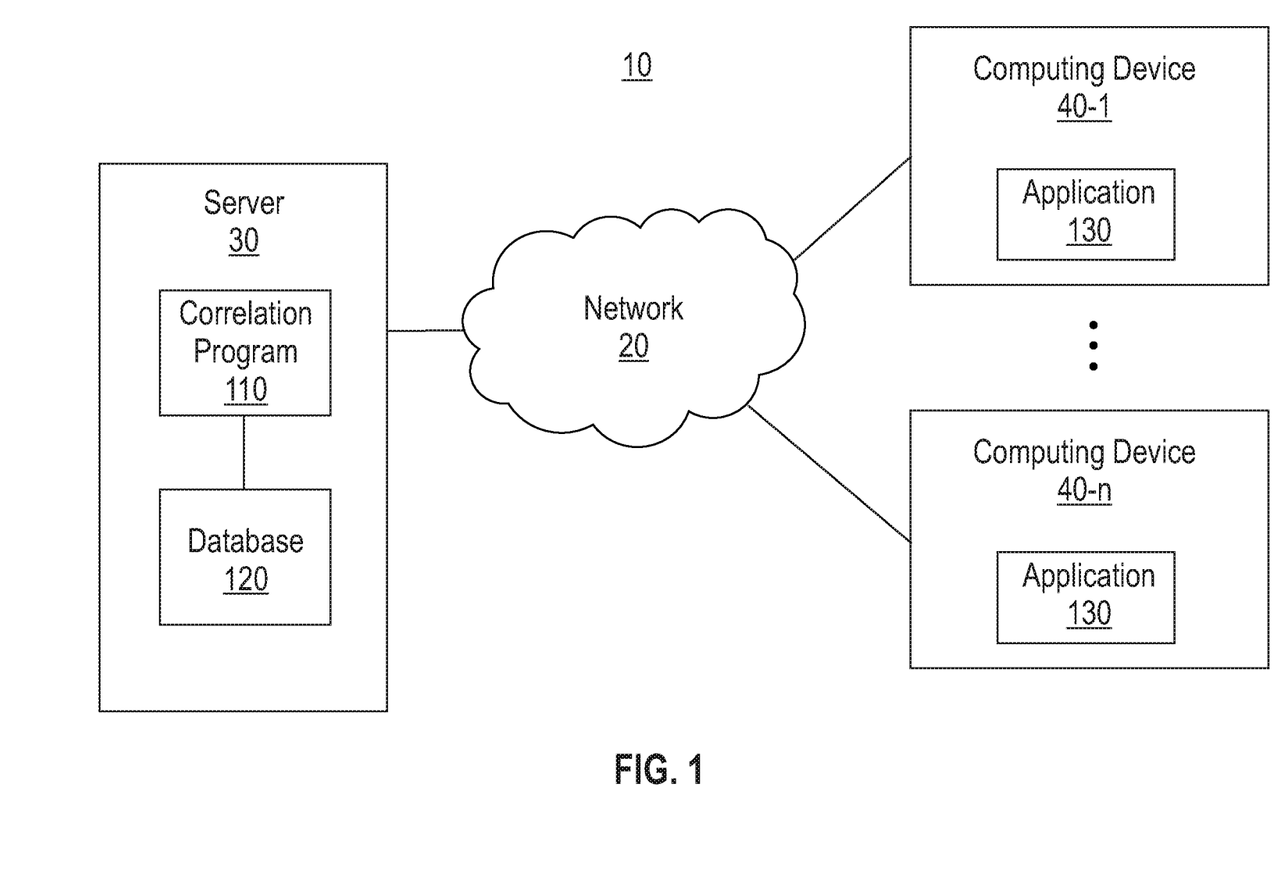
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing device 40 is labeled as "1-n," (e.g., 40-1 through 40-n) which signifies there may be one computing device 40 or any number (e.g., n-number) of computing devices 40 in various embodiments of the present invention. Hereafter, computing device 40, when mentioned without "1-n," will signify any one specific computing device (or multiple computing devices) within the collective computing device 40 "1-n."

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains correlation program 110 and database 120. In other embodiments, server 30 may include correlation program 110, database 120, and/or other components, as depicted and described in further detail with respect to FIG. 3.

Computing device 40 may be a personal device (e.g., mobile phone or smartphone), desktop computer, laptop computer, netbook computer, tablet computer, management server, web server, application server, virtual machine, container, or unikernel. In general, computing device 40 may be any electronic device or computing system capable of processing program instructions, sending and receiving data, and communicating with other devices over a network. In the depicted embodiment, computing device 40 contains application 130. In other embodiments, computing device 40 may include application 130 and/or other components, as depicted and described in further detail with respect to FIG. 3.

Correlation program 110 determines optimal performance-related configurations of applications by analyzing peer data. In doing so, correlation program 110 receives application configuration parameters, system parameters, and performance metrics. Correlation program 110 analyzes the application configuration parameters, system parameters, and performance metrics. Correlation program 110 recommends configuration settings. In the depicted embodiment, correlation program 110 resides on server 30. In other embodiments, correlation program 110 may reside on another server, computing device 40, or another computing device, provided that correlation program 110 can access database 120 and application 130.

Database 120 may be a repository that may be written to and/or read by correlation program 110. In some embodiments, correlation program 110 may retrieve sets of application configurations for an application used on a plurality of servers and store the sets of application configurations to database 120. In other embodiments, database 120 may store information about servers and devices used to run similar applications. In the depicted embodiment, database 120 resides on server 30. In other embodiments, database 120 may reside on another server, computing device 40, or another computing device, provided that database 120 is accessible to correlation program 110.

Application 130 may be any application, program, or software on computing device 40 that may be accessed by correlation program 110. For example, application 130 may be an application, program, or software designed to allow a user to perform multiple transactions. Correlation program 110 may use a set of configurations from various instances of application 130 from a plurality of devices to replicate data to determine a set of configurations for optimal performance for other users who may be using application 130 on another computing device. In the depicted embodiment, application 130 resides on computing device 40. In other embodiments, application 130 may reside on another computing device or another server, provided that application 130 is accessible to correlation program 110.

Figure 2:
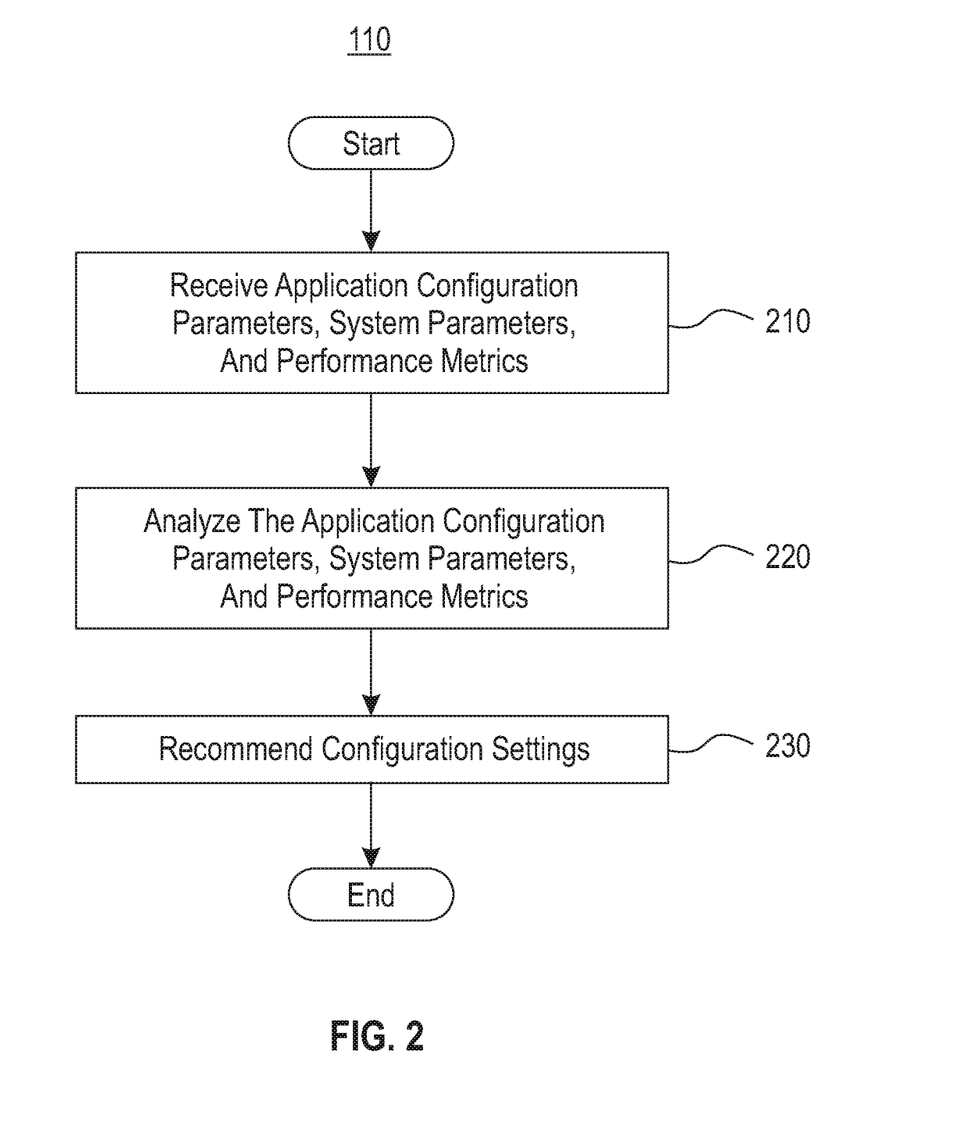
FIG. 2 depicts a flowchart of the steps of a correlation program, executing within the computing system of FIG. 1, for determining optimal performance-related configurations of applications by analyzing peer data.

FIG. 2 depicts a flowchart of the steps of a correlation program, executing within the computing system of FIG. 1, in accordance with an embodiment of the present invention. Correlation program 110 determines optimal performance-related configurations of applications by analyzing peer data.

In step 210, correlation program 110 receives application configuration parameters, system parameters, and performance metrics from application 130. The application configuration parameters include application configurations and configurable kernel parameters. The kernel is a computer program that is the core of a computer's operating system, having complete control over everything in the system. Examples of application configurations include the following: query_cache_size=16MB; sort_buffer_size=4M; innodb_io_capacity=400; innodb_flush_method=O_DIRECT; read_buffer_size=2M; wait_timeout=600; ES_HEAP_SIZE; MAX OPEN_FILES; worker_rlimit_nofile 1024; worker_connections 4096; and types_hash_max size 2048. Examples of configurable kernel parameters include the following: dev.hpet.max-user-freq=64; dev.mac_hid.mouse_button2_keycode=97; dev.parport.default.timeslice=200; dev.raid.speed_limit_max=200000; dev.raid.speed_limit_min=1000; fs.quota.syncs=8304; kernel.auto_msgmni=1; kernel.bootloader_type=114; kernel.bootloader_version=2; and kernel.cap_last_cap=36. Examples of system parameters include the following: CPU cache size; CPU clock speed; number of CPU cores; memory size; network bandwidth; disk I/O bandwidth; OS distro type; OS version; kernel version; file system type; file system space; HDD rpm; instruction set architecture type; and virtualization type (in case of virtual machine). Examples of performance metrics include the following: CPU; memory; network utilization; open network connections; and open files.

In one embodiment, correlation program 110 monitors live instances of computing device 40 running application 130 and uses a crawler and parser (not shown) to retrieve data related to application configuration parameters, system parameters, and performance metrics of computing device 40 and application 130. In other embodiments, computing device 40 sends data related to application configuration parameters, system parameters, and performance metrics of computing device 40 and application 130 to correlation program 110. In some embodiments, correlation program 110 stores the retrieved data to database 120 until enough data (whether a predetermined amount of data or generally based on time) is present for future correlation use.

In one embodiment, correlation program 110 collects application configuration parameters, system parameters, and performance metrics from explicit status monitors. For example, apache's status webpages can be queried to extract: number of bytes transferred per second; number of requests per second; number of bytes per request; and number of workers serving requests versus idle workers. By way of another example, databases can be queried (e.g., libdbi) to extract system health, provided correlation program 110 would be privy to certain credentials necessary for access. Similarly, middleware metrics can be obtained through libraries. For example, memcached server metrics via libmemcached and redis metrics via credis library.

In other embodiments, correlation program 110 may approximate from system metrics by, for example: ratio of received to transmitted (rx/tx) packets (or bytes) to approximate network throughput, where finer granularity information can be collected by network sniffing (libpcap); CPU wait time (wa) to approximate disk load; kswapd swap daemon activity and swap memory usage to approximate memory pressure. In some embodiments, such approximations are acceptable because only relative performance is necessary. In some embodiments, correlation program 110 may infer from log files (e.g., calculate requests per second or request processing times from apache's access_log).

In step 220, correlation program 110 analyzes the application configuration parameters, system parameters, and performance metrics. In one embodiment, correlation program 110 determines a correlation between the application configuration parameters and the system parameters. Correlation program 110 performs an all pair analysis between the application configuration parameters and the system parameters to determine a correlation and dependency of system parameters on application configuration parameters. The all pair analysis tests all possible discrete combinations of the system parameters and the application configuration parameters. Using carefully chosen test vectors, this can be done much faster than an exhaustive search of all combinations of all parameters, by parallelizing the tests of parameter pairs.

In one embodiment, correlation program 110 determines a linear correlation and dependency between the application configuration parameters and the system parameters, using the Pearson product-moment correlation coefficient (PPMCC). In doing so, correlation program 110 constructs a correlation matrix that consists of the covariance of two variables (namely, an application configuration parameter and a system parameter) divided by the product of the standard deviation of each variable. Correlation program 110 uses a threshold-based filtering, which increases a threshold until dependence is narrowed down to a few system parameters.

The covariance is a measure of the joint variability of two random variables. If the greater values of one variable mainly correspond with the greater values of the other variable, and the same holds for the lesser values, then the variables tend to show similar behavior and the covariance is positive. The sign of the covariance shows the tendency in the linear relationship between the variables. The correlation coefficient shows, by its magnitude, the strength of the linear relation. The PPMCC is a measure of the linear correlation between the two variables. The values fall between +1 and −1, where +1 is a total positive linear correlation, 0 is no linear correlation, and −1 is a total negative correlation.

For example, if a scatter plot of an application configuration parameter and a system parameter is randomly distributed, then there is no relationship and no correlation between that application configuration parameter and system parameter. On the other hand, there is a relationship and a correlation if a scatter plot of an application configuration parameter and a system parameter shows one distinct cluster and outliers, multiple clusters forming trends, and a clear trend. For example, one system parameter may depend on one application configuration parameter, multiple system parameters may depend on one application configuration parameter, or one system parameter may depend on multiple application configuration parameters.

In one embodiment, correlation program 110 builds performance models for each range of system parameters using the application configuration parameters and performance metrics. In doing so, correlation program 110 creates a multi-dimensional graph, where the system parameter is on the x-axis, the application configuration parameter is on the y-axis, and the performance metric is on the z-axis. The value of the application configuration parameter where there is optimal performance is now the unknown variable. For example, there are multiple values of an application configuration parameter for one value of a system parameter. Correlation program 110 determines the value of the application configuration parameter when the performance metric is at its highest point for the given value of the system parameter. The determined value of the application configuration parameter is considered the optimal performance configuration setting for a system with the given system parameter value.

In step 230, correlation program 110 recommends configuration settings, based on the analysis in step 220. In one embodiment, correlation program 110 recommends, to a user, the optimal performance (and security) configuration settings (i.e., tuned configurations) of computing device 40 and application 130 for a given system and particular system parameters. In other embodiments, correlation program 110 recommends, to a service provider, the optimal performance configuration settings of computing device 40 and application 130 for a given system and particular system parameters. Correlation program 110 may store the recommendations to database 120 for future use, wherein the future use may be using the recommendations for similar systems. The recommendations may be sent to the user, service provider, or anyone else who may benefit from a knowledge of the optimal performance configuration settings of computing device 40 and application 130 by any available means known in the art; for example, via a user interface, email, phone, message, etc.

For privacy and security purposes, in one embodiment, a user/service provider signs up for the present invention, preventing another user/service provider from stealing tuned configurations that may be recommended. In exchange for a user/service provider sharing their tuned configurations for an application, the user/service provider receives access to the tuned configurations for other users'/service providers' applications. In one embodiment, tuned configurations are shown as suggestions, where the user/service provider may accept, reject, or modify the tuned configurations. In some embodiments, if the user/service provider accepts the tuned configurations, correlation program 110 automatically changes the user's/service provider's current configuration settings to the recommended tuned configurations. In other embodiments, the user/service provider may continue to use their own/default configuration while testing the recommended tuned configuration in a separate device (e.g., a separate container) with workload replication.

In other embodiments, subsequent to step 220, correlation program 110 automatically changes the user's/service provider's current configuration settings to the tuned configurations. In one embodiment, after the automatic change, correlation program 110 notifies the user/service provider by any available means known in the art (e.g., via a user interface, email, phone, message, etc.) and gives the user the opportunity to accept the changes, modify the changes, or reject the changes and return to the user's previous configuration settings.

Figure 3:
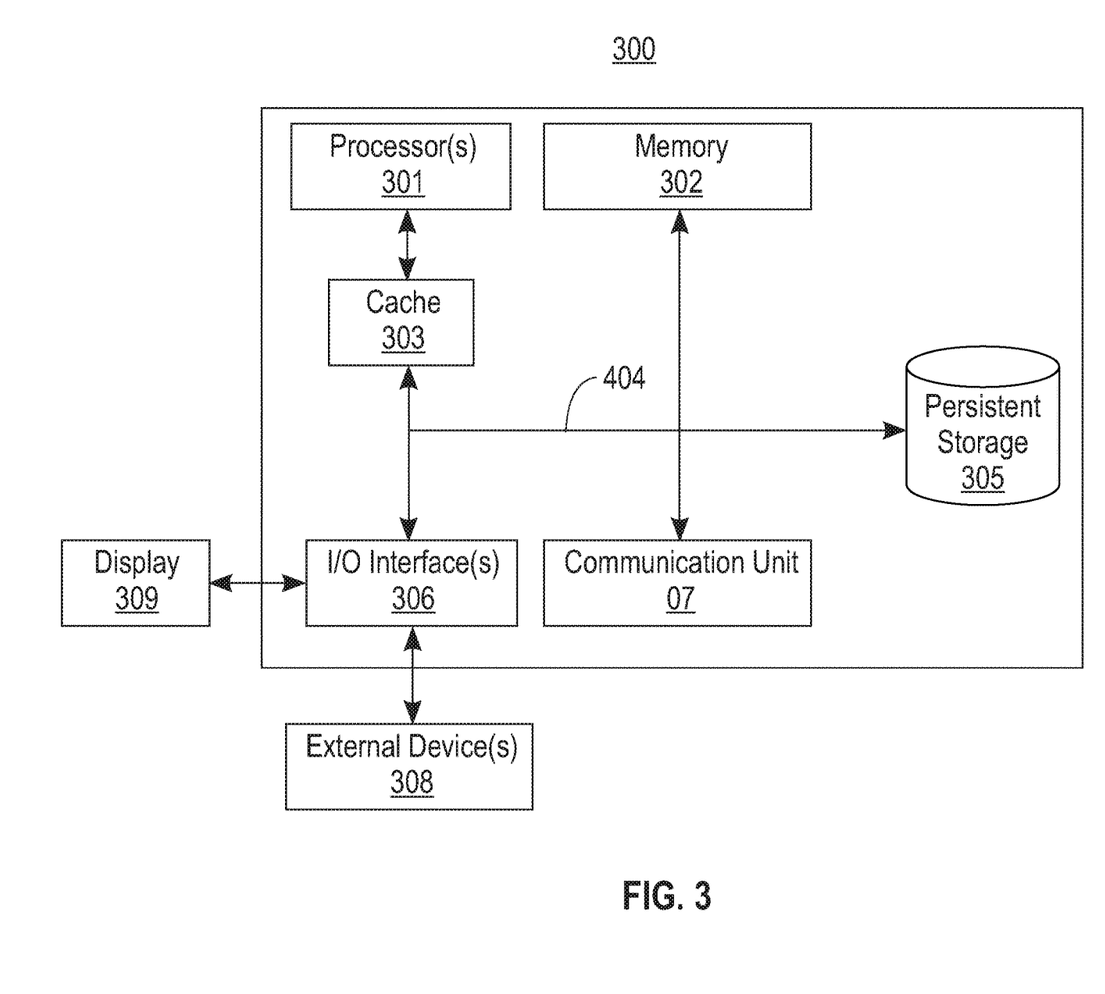
FIG. 3 depicts a block diagram of components of the server and/or the computing devices of FIG. 1, in accordance with an embodiment of the present invention.

FIG. 3 depicts computer system 300, which is an example of a system that includes components of server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Correlation program 110 and database 120 may be downloaded to persistent storage 305 of server 30 through communications unit 307 of server 30. Application 130 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., correlation program 110 and database 120, can be stored on such portable computer readable storage media and can be loaded onto persistent storage 305 of server 30 via I/O interface(s) 306 of server 30. Software and data used to practice embodiments of the present invention, e.g., application 130, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   monitoring, by one or more processors, instances of an application, wherein the instances of the application are running on a plurality of devices;
   receiving, by one or more processors, data related to: configuration parameters of the application, system parameters of the plurality of devices, and performance metrics of the plurality of devices;
   determining, by one or more processors, correlation and dependencies between the configuration parameters with associated system parameters, using an all pair analysis and a Pearson product-moment correlation coefficient (PPMCC), wherein using the all pair analysis comprises:
   testing, by one or more processors, possible discrete combinations of the configuration parameters and the system parameters, using test vectors to parallelize the tests of parameter pairs;
   determining, by one or more processors, dependencies between the configuration parameters with performance metrics; and
   recommending, by one or more processors, to a user, configuration settings of the application, based on the analysis of the data.

2. The method of claim 1, further comprising:
   registering, by one or more processors, for an account for access by the user; and
   receiving, by one or more processors, access to the configuration settings recommended to a plurality of users of the application running on the plurality of devices.

3. The method of claim 1, further comprising:
   subsequent to the recommendation, continuing, by one or more processors, to use a current configuration setting; and
   testing, by one or more processors, the recommended configuration settings in a separate device with workload replication.

4. The method of claim 1, further comprising:
   automatically changing, by one or more processors, current configuration settings of the user to the recommended configuration settings.

5. The method of claim 1, wherein determining correlation and dependencies between the configuration parameters with associated system parameters using the PPMCC comprises:
   constructing, by one or more processors, a correlation matrix that includes a covariance of two variables divided by a product of a standard deviation of each of the two variables, wherein the two variables are a value for one of the configuration parameters and a value for one of the system parameters.

6. The method of claim 1, wherein determining dependencies between the configuration parameters with performance metrics comprises:
  building, by one or more processors, a performance model for a given value of one of the system parameters, using a plurality of values for the configuration parameters associated with the given value of one of the system parameters and values for one of the performance metrics by creating a multi-dimensional graph, wherein the configuration parameters, the system parameters, and the performance metrics, each, represent a separate axis on the graph; and
  determining, by one or more processors, which value of the plurality of values for the configuration parameters corresponds to one of the values for one of the performance metrics when the value for one of the performance metrics is at a highest point for the given value of one of the system parameters.

7. The method of claim 1, wherein, subsequent to the recommendation, the user has an option to select from the group consisting of: accepting the recommended configuration settings, rejecting the recommended configuration settings, and modifying the recommended configuration settings.

8. A computer program product comprising:
  one or more computer readable storage media and program instructions stored on the one or more computer readable storage media, the program instructions comprising:
  program instructions to monitor instances of an application, wherein the instances of the application are running on a plurality of devices;
  program instructions to receive data related to: configuration parameters of the application, system parameters of the plurality of devices, and performance metrics of the plurality of devices;
  program instructions to determine correlation and dependencies between the configuration parameters with associated system parameters, using an all pair analysis and a Pearson product-moment correlation coefficient (PPMCC), wherein using the all pair analysis comprises:
    program instructions to test possible discrete combinations of the configuration parameters and the system parameters, using test vectors to parallelize the tests of parameter pairs;
  program instructions to determine dependencies between the configuration parameters with performance metrics; and
  program instructions to recommend to a user, configuration settings of the application, based on the analysis of the data.

9. The computer program product of claim 8, further comprising:
  program instructions to register for an account for access by the user; and
  program instructions to receive access to the configuration settings recommended to a plurality of users of the application running on the plurality of devices.

10. The computer program product of claim 8, further comprising:
  subsequent to the recommendation, program instructions to continue to use a current configuration setting; and
  program instructions to test the recommended configuration settings in a separate device with workload replication.

11. The computer program product of claim 8, further comprising:
  program instructions to automatically change current configuration settings of the user to the recommended configuration settings.

12. The computer program product of claim 8, wherein program instructions to determine correlation and dependencies between the configuration parameters with associated system parameters using the PPMCC comprise:
  program instructions to construct a correlation matrix that includes a covariance of two variables divided by a product of a standard deviation of each of the two variables, wherein the two variables are a value for one of the configuration parameters and a value for one of the system parameters.

13. The computer program product of claim 8, wherein program instructions to determine dependencies between the configuration parameters with performance metrics comprise:
  program instructions to build a performance model for a given value of one of the system parameters, using a plurality of values for the configuration parameters associated with the given value of one of the system parameters and values for one of the performance metrics by creating a multi-dimensional graph, wherein the configuration parameters, the system parameters, and the performance metrics, each, represent a separate axis on the graph; and
  program instructions to determine which value of the plurality of values for the configuration parameters corresponds to one of the values for one of the performance metrics when the value for one of the performance metrics is at a highest point for the given value of one of the system parameters.

14. The computer program product of claim 8, wherein, subsequent to the recommendation, the user has an option to select from the group consisting of: accepting the recommended configuration settings, rejecting the recommended configuration settings, and modifying the recommended configuration settings.

15. A computer system comprising:
  one or more computer processors, one or more computer readable storage media, and program instructions stored on the computer readable storage media for execution by at least one of the one or more processors, the program instructions comprising:
  program instructions to monitor instances of an application, wherein the instances of the application are running on a plurality of devices;
  program instructions to receive data related to: configuration parameters of the application, system parameters of the plurality of devices, and performance metrics of the plurality of devices;
  program instructions to determine correlation and dependencies between the configuration parameters with associated system parameters, using an all pair analysis and a Pearson product-moment correlation coefficient (PPMCC), wherein using the all pair analysis comprises:
    program instructions to test possible discrete combinations of the configuration parameters and the system parameters, using test vectors to parallelize the tests of parameter pairs;
  program instructions to determine dependencies between the configuration parameters with performance metrics; and program instructions to recommend to a user, configuration settings of the application, based on the analysis of the data.

16. The computer system of claim 15, further comprising:
program instructions to register for an account for access by the user; and
program instructions to receive access to the configuration settings recommended to a plurality of users of the application running on the plurality of devices.

17. The computer system of claim 15, further comprising:
subsequent to the recommendation, program instructions to continue to use a current configuration setting; and
program instructions to test the recommended configuration settings in a separate device with workload replication.

18. The computer system of claim 15, further comprising:
program instructions to automatically change current configuration settings of the user to the recommended configuration settings.

19. The computer system of claim 15, wherein program instructions to determine correlation and dependencies between the configuration parameters with associated system parameters using the PPMCC comprise:
program instructions to construct a correlation matrix that includes a covariance of two variables divided by a product of a standard deviation of each of the two variables, wherein the two variables are a value for one of the configuration parameters and a value for one of the system parameters.

20. The computer system of claim 15, wherein program instructions to determine dependencies between the configuration parameters with performance metrics comprise:
program instructions to build a performance model for a given value of one of the system parameters, using a plurality of values for the configuration parameters associated with the given value of one of the system parameters and values for one of the performance metrics by creating a multi-dimensional graph, wherein the configuration parameters, the system parameters, and the performance metrics, each, represent a separate axis on the graph; and
program instructions to determine which value of the plurality of values for the configuration parameters corresponds to one of the values for one of the performance metrics when the value for one of the performance metrics is at a highest point for the given value of one of the system parameters.

* * * * *